(12) United States Patent
Ueda et al.

(10) Patent No.: US 9,073,427 B2
(45) Date of Patent: Jul. 7, 2015

(54) CONTROL DEVICE FOR HYBRID VEHICLE

(71) Applicant: Mitsubishi Jidosha Kogyo Kabushiki Kaisha, Tokyo (JP)

(72) Inventors: Katsunori Ueda, Okazaki (JP); Shigetoshi Hirano, Toyoake (JP); Yusuke Sasaki, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/139,431

(22) Filed: Dec. 23, 2013

(65) Prior Publication Data

US 2014/0194246 A1 Jul. 10, 2014

(30) Foreign Application Priority Data

Jan. 9, 2013 (JP) .................. 2013-001912

(51) Int. Cl.
| | |
|---|---|
| *F16H 61/02* | (2006.01) |
| *F16H 61/12* | (2010.01) |
| *B60K 6/442* | (2007.10) |
| *B60W 10/02* | (2006.01) |
| *B60W 10/06* | (2006.01) |
| *B60W 20/00* | (2006.01) |
| *F16H 61/06* | (2006.01) |

(52) U.S. Cl.
CPC .............. *B60K 6/442* (2013.01); *Y10S 903/946* (2013.01); *Y10T 477/26* (2015.01); *F16H 61/12* (2013.01); *F16H 61/061* (2013.01); *F16H 61/0206* (2013.01); *B60W 10/02* (2013.01); *B60W 10/06* (2013.01); *B60W 2510/0241* (2013.01); *B60W 2710/0644* (2013.01); *B60W 20/20* (2013.01); *B60W 20/50* (2013.01); *Y02T 10/6234* (2013.01)

(58) Field of Classification Search
CPC .... F16H 61/061; F16H 61/0206; F16H 61/12
USPC ................................. 477/5, 6, 8, 11
See application file for complete search history.

(56) References Cited

U.S. PATENT DOCUMENTS

| | | | | |
|---|---|---|---|---|
| 3,460,656 | A | * | 8/1969 | Swanson ...................... 192/48.5 |
| 6,517,464 | B2 | * | 2/2003 | Yamazaki et al. ................. 477/5 |
| 7,160,225 | B2 | * | 1/2007 | Berger et al. ...................... 477/5 |
| 2014/0018207 | A1 | * | 1/2014 | Kobayashi et al. ............... 477/5 |

FOREIGN PATENT DOCUMENTS

| | | |
|---|---|---|
| JP | 2007-320388 A | 12/2007 |
| JP | 2009-202712 A | 9/2009 |
| JP | 2012-081811 A | 4/2012 |

* cited by examiner

*Primary Examiner* — Tisha Lewis
(74) *Attorney, Agent, or Firm* — Birch, Stewart, Kolasch & Birch, LLP

(57) ABSTRACT

In a series mode, a clutch rotational speed difference ΔN is calculated, and when the clutch rotational speed difference ΔN is within a first predetermined range R1 it is determined whether a sticking determination timer t1 indicates a first predetermined time t1 or longer. When a closed sticking timer t indicates the first predetermined time t1 or longer, fuel cut is performed, and the clutch rotational speed difference ΔN is re-calculated. When the closed sticking timer t indicates a second predetermined time t2 or longer, and the clutch rotational speed difference ΔN is within a second predetermined range R2, it is determined that there is closed sticking of a clutch. When the closed sticking timer t indicates less than the time t2, and the clutch rotational speed difference ΔN is out of the second predetermined range R2, it is determined that there is no closed sticking of the clutch.

6 Claims, 4 Drawing Sheets

CONTROL DEVICE FOR HYBRID VEHICLE

BACKGROUND OF THE INVENTION

1. Field of the Invention

The present invention relates to a control device for a vehicle, and more particularly to failure detection of a clutch provided in hybrid a vehicle.

2. Description of the Related Art

In recent years, a hybrid vehicle has been developed that includes both an internal combustion engine and an electric motor used as power sources. A control mode of the hybrid vehicle mainly includes a series mode and a parallel mode. The series mode is a mode in which power of an internal combustion engine drives a power generator, and electric power obtained by the power generator drives an electric motor coupled to a drive axle, thereby causing a vehicle to travel. The parallel mode is a mode in which power of the internal combustion engine drives the drive axle, electric power obtained by a storage battery drives the electric motor coupled to the drive axle, and any one or both of the power of the internal combustion engine and the power of the electric motor are used depending on a driving state of the vehicle to cause the vehicle to travel.

In such a hybrid vehicle, a clutch provided between drive wheels and the internal combustion engine is connected/disconnected to switch between the series mode and the parallel mode.

However, in the hybrid vehicle including the clutch, if closed sticking of the clutch occurs that is sticking of the clutch in a connected state, a rotational speed of the internal combustion engine decreases with decreasing vehicle speed. The decrease in rotational speed of the internal combustion engine provides unstable rotation of the internal combustion engine, leading to poor behavior of the vehicle.

Thus, as a method for determining closed sticking of a clutch, there is a method for determining closed sticking of a clutch based on a gradient of an increase in rotational speed of an electric motor in a released state of the clutch (Japanese Patent Laid-Open No. 2009-202712).

In a drive device for a vehicle described in Japanese Patent Laid-Open No. 2009-202712, a clutch is provided between a transmission and an electric motor, a clutch is provided between the electric motor and an internal combustion engine, and closed sticking of the clutches is determined based on a gradient of an increase in rotational speed of the electric motor in a released state of the clutches.

However, in a hybrid vehicle in which an electric motor and drive wheels are connected without via a clutch, further an internal combustion engine and the drive wheels are connected via a clutch, and the internal combustion engine drives a power generator to generate electric power, the electric motor and the drive wheels are connected without via the clutch. Thus, if a rotational speed of the electric motor is increased to determine closed sticking of the clutch, a vehicle speed of the vehicle also increases, which disadvantageously disturbs behavior of the vehicle.

Also, as another method for determining closed sticking of a clutch, there is a method for determining closed sticking of a clutch from a difference between a rotational speed on an upstream side of power transmission of the clutch and a rotational speed on a downstream side of power transmission of the clutch. However, in a hybrid vehicle in which an electric motor and drive wheels are connected without via a clutch, further an internal combustion engine and the drive wheels are connected via a clutch, and the internal combustion engine drives a power generator to generate electric power, it is likely that a rotational speed on an upstream side of power transmission of the clutch approaches a rotational speed on a downstream side of power transmission of the clutch to reduce a difference between the rotational speeds, thereby causing erroneous determination of closed sticking of the clutch, even in a series mode, depending on a traveling state of the vehicle and a power generation state of the power generator.

SUMMARY OF THE INVENTION

The present invention is achieved to solve such a problem, and has an object to provide a control device for a hybrid vehicle that can accurately determine closed sticking of a clutch.

To achieve the object, the present invention provides a control device for a hybrid vehicle comprising: an internal combustion engine provided in the vehicle; a power generator that is driven by the internal combustion engine to generate electric power; a secondary battery that stores the electric power generated by the power generator; an electric motor that drives drive wheels of the vehicle using electric power supplied from the secondary battery; a clutch that connects/disconnects a transmission path that transmits power from the internal combustion engine to the drive wheels; a mode switching unit for switching between a first travel mode in which the clutch is released, the internal combustion engine drives the power generator to generate electric power, and the electric motor drives the drive wheels to cause the vehicle to travel, and a second travel mode in which the clutch is connected, and power of the internal combustion engine is transmitted to the drive wheels to cause the vehicle to travel; a rotational speed difference detection unit for detecting a difference between a rotational speed of an upstream clutch provided on a side of the internal combustion engine of the transmission path and a rotational speed of a downstream clutch provided on a side of the drive wheels of the transmission path; a rotational speed variable unit for performing rotational speed variable control to change the rotational speed of the upstream clutch provided on the side of the internal combustion engine when the difference between the rotational speeds detected by the rotational speed difference detection unit is held within a predetermined range for a predetermined period in the first travel mode; and a sticking determination unit for performing sticking determination of the clutch based on the difference between the rotational speeds in the rotational speed variable control.

Thus, when there is a large difference between the rotational speeds in the rotational speed variable control, it can be determined that there is no sticking of the clutch. When there is no difference or there is an extremely small difference between the rotational speeds, the rotational speed of the upstream clutch provided on the side of the internal combustion engine approaches the rotational speed of the downstream clutch provided on the side of the drive wheels, rotation of the upstream clutch provided on the side of the internal combustion engine is synchronized with rotation of the downstream clutch provided on the side of the drive wheels, and thus it can be determined that there is sticking of the clutch.

Thus, for example, depending on a traveling state of the vehicle and a power generation state of the power generator by driving of the internal combustion engine, even if the rotational speed of the upstream clutch provided on the side of the internal combustion engine approaches the rotational speed of the downstream clutch provided on the side of the drive wheels, presence or absence of sticking of the clutch can be reliably determined.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Now, an embodiment of the present invention will be described with reference to the drawings.

Figure 1:
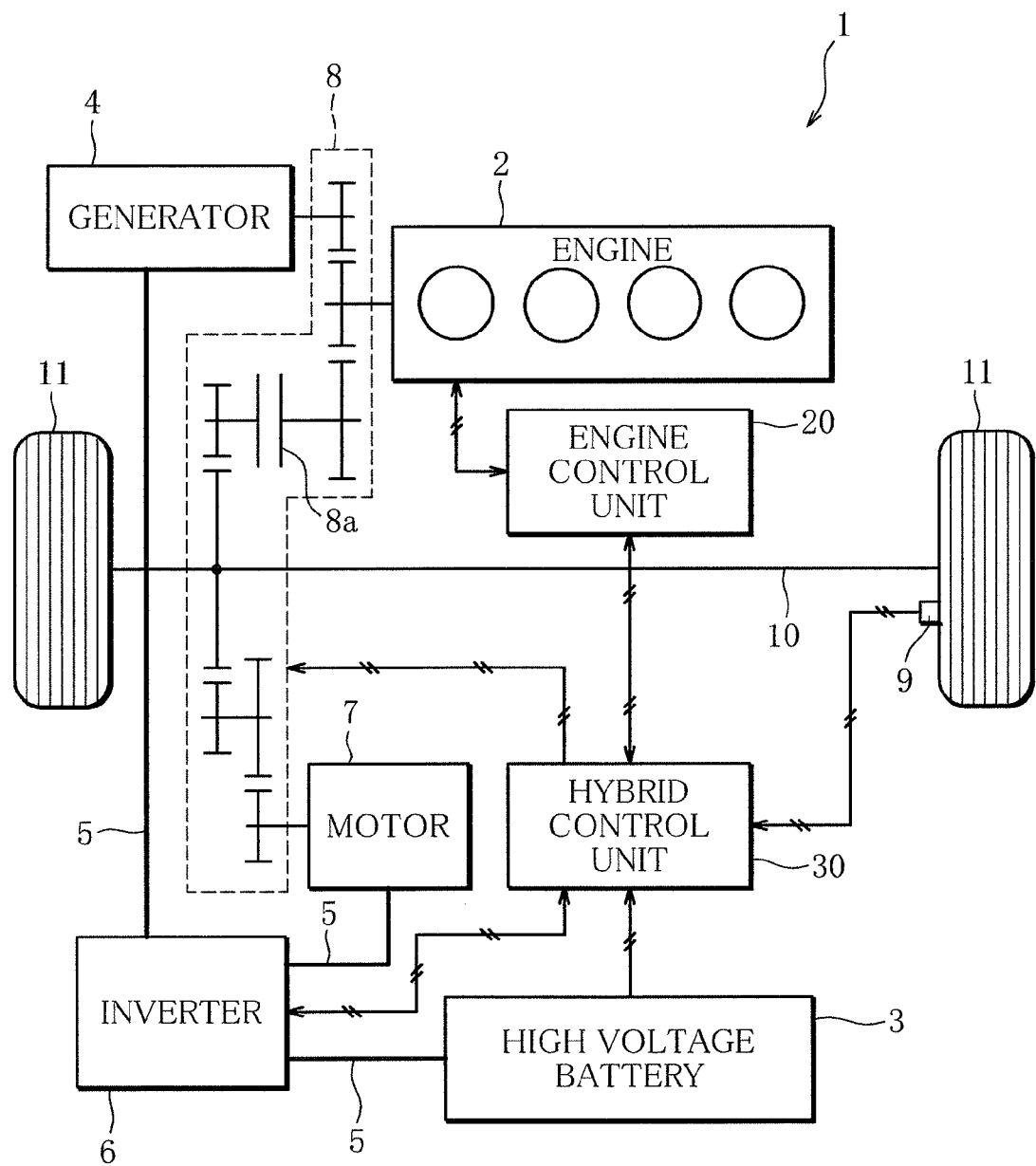
FIG. 1 is a schematic diagram of a vehicle to which a control device for a hybrid vehicle according to the present invention is applied.

FIG. 1 is a schematic diagram of a vehicle including a control device for a hybrid vehicle according to the present invention. Now, a configuration of the control device for a hybrid vehicle will be described.

As shown in FIG. 1, a vehicle 1 in which a control device for a hybrid vehicle according to the present invention is used is a hybrid vehicle that includes, as traveling devices for the vehicle 1, an engine (internal combustion engine) 2 to which fuel is supplied from a fuel tank (not shown) via a fuel pipe, and that drives drive wheels 11 via a reducer 8 and a drive axle 10, and a motor (electric motor) 7 to which electric power of high voltage is supplied from a high voltage battery (secondary battery) 3 and a generator (power generator) 4 via a high voltage circuit 5, whose operation is controlled by an inverter 6, and that drives the drive wheels 11 via the reducer 8 and the drive axle 10, wherein a charge cable extending from an external power supply is connected to a charging inlet lid (not shown), and the high voltage battery can be charged by a charger.

As shown in FIG. 1, the control device for a hybrid vehicle according to the present invention includes the engine 2 provided in the vehicle 1, the generator 4, the inverter 6, the motor 7, the reducer (transmission path) 8 including a clutch 8a therein, a vehicle speed sensor (a rotational speed difference detection unit) 9, an engine control unit (a rotational speed variable unit) 20, and a hybrid control unit (a rotational speed difference detection unit, a sticking determination unit) 30.

The engine 2 includes a plurality of electronic control instruments such as an electronic control throttle valve that controls a flow rate of air flowing into a combustion chamber (not shown) for controlling output torque and a rotational speed of the engine 2, and a fuel injection valve that supplies fuel into an intake passage (not shown) or the combustion chamber. The engine 2 also includes a plurality of sensors such as a crank angle sensor that detects the rotational speed of the engine 2 for grasping an operation state of the engine 2. The engine 2 is controlled by the engine control unit 20 to generate power based on a control signal such as a requested output value supplied from the hybrid control unit 30 to the engine control unit 20. The power generated by the engine 2 is transmitted to the generator 4 via the reducer 8 with a fixed change gear ratio, and the drive axle (transmission path) 10 that drives the drive wheels 11 via the clutch 8a included in the reducer 8.

The high voltage battery 3 includes a secondary battery such as a lithium-ion battery. The high voltage battery 3 also includes a battery module including a plurality of modules, each module including a plurality of battery cells having a cell monitoring unit that monitors the battery cells, and a battery monitoring unit that monitors a temperature and a state of charge (hereinafter referred to as SOC) of the battery module based on an output signal from the cell monitoring unit.

The generator 4 is driven by the engine 2 to generate electric power, and supplies the electric power to the high voltage battery 3 and the motor 7 via the inverter 6. The operation of the generator 4 is controlled by the inverter 6.

The inverter 6 includes a motor control unit and a generator control unit (not shown), and controls an amount of electric power generation of the generator 4 and an output of the motor 7 based on a control signal from the hybrid control unit 30.

The motor 7 is driven by electric power generated by the generator 4 or electric power stored in the high voltage battery 3. The motor 7 drives the drive wheels 11 via the reducer 8 and the drive axle 10.

The reducer 8 includes the clutch 8a therein. The clutch 8a is mounted between the engine 2 and the drive axle 10, and includes an upstream clutch provided on a side of the engine 2 and a downstream clutch provided on a side of the drive wheels 11. The clutch 8a connects/disconnects transmission of power of the engine 2 to the drive axle 10 based on the control signal from the hybrid control unit 30.

The vehicle speed sensor 9 detects a vehicle speed of the vehicle 1 from a rotational speed of the drive wheels 11. The vehicle speed sensor 9 supplies a vehicle speed signal to the hybrid control unit 30.

The engine control unit 20 is a control device for generally controlling the engine 2, and includes an input/output device, a storage device (ROM, RAM, nonvolatile RAM, or the like), a central processing unit (CPU), a timer, or the like.

To an input side of the engine control unit 20, a plurality of electronic control instruments such as the electronic control throttle valve or the fuel injection valve provided in the engine 2, a plurality of sensors such as the crank angle sensor provided in the engine 2, and the hybrid control unit 30 are connected, and detection information from these instruments and sensors are input.

On the other hand, to an output side of the engine control unit 20, the plurality of electronic control instruments provided in the engine 2 and the hybrid control unit 30 are connected.

The engine control unit 20 controls the operation of the plurality of electronic control instruments to control a fuel injection amount and an intake air amount so as to provide an engine output requested by the hybrid control unit 30 based on a request signal of the engine output sent from the hybrid control unit 30.

The hybrid control unit 30 is a control device for generally controlling the vehicle 1, and includes an input/output device, a storage device (ROM, RAM, nonvolatile RAM, or the like), a central processing unit (CPU), a timer, or the like.

To an input side of the hybrid control unit 30, the battery monitoring unit of the high voltage battery 3, the motor control unit and the generator control unit of the inverter 6, sensors such as the vehicle speed sensor 9 and an accelerator position sensor (not shown), and the engine control unit 20 are connected, and detection information from these instruments are input.

On the other hand, to an output side of the hybrid control unit 30, the motor control unit and the generator control unit of the inverter 6, the reducer 8, and the engine control unit 20 are connected. The hybrid control unit 30 and the engine control unit 20 are connected by a controller area network in which the control units are connected to each other to allow high speed transfer of control information.

The hybrid control unit 30 sends a control signal to the reducer 8, the engine control unit 20, the motor control unit, and the generator control unit based on detection information of the battery monitoring unit of the high voltage battery 3, the motor control unit and the generator control unit of the inverter 6, the sensors such as the vehicle speed sensor 9 and the accelerator position sensor, to control switching of a hybrid control mode, outputs of the engine 2 and the motor 7, and the amount of electric power generation of the generator 4.

Specifically, the hybrid control mode includes an electric vehicle mode (hereinafter referred to as EV mode), a series mode (first travel mode), and a parallel mode (second travel mode). The hybrid control unit 30 switches the hybrid control mode to the electric vehicle mode (hereinafter referred to as EV mode) when SOC of the high voltage battery 3 is sufficient and the vehicle speed and load are low. Also, the hybrid control unit 30 switches the hybrid control mode to the series mode when the SOC of the high voltage battery 3 is insufficient for the EV mode or when high electric power is required in acceleration or the like. The hybrid control unit 30 switches the hybrid control mode to the parallel mode in traveling in a high speed region with high efficiency of the engine 2, that is, high fuel efficiency of the engine 2. The hybrid control unit 30 sends a request signal to the engine control unit 20 so as to provide output torque of the engine 2 depending on the amount of electric power generation of the generator 4, the vehicle speed, and the load in the series mode and the parallel mode.

The EV mode is a series mode described later in which the operation of the engine 2 is stopped, the clutch 8a in the reducer 8 is disconnected, the motor 7 is driven by electric power stored in the high voltage battery 3, and the drive wheels 11 are driven by power of the motor 7 to cause the vehicle 1 to travel, that is, the engine 2 is not operated.

In the series mode, the clutch 8a in the reducer 8 is disconnected, the operation of the engine 2 is controlled, the generator 4 is driven by the engine 2 and, while the high voltage battery 3 is charged with electric power generated by the generator 4 so as to prevent the SOC of the high voltage battery 3 from being less than a predetermined value, the motor 7 is driven by electric power generated by the generator 4 and electric power stored in the high voltage battery 3, and the drive wheels 11 are driven by power of the motor 7 to cause the vehicle 1 to travel. Specifically, the series mode is a mode in which the vehicle 1 is not caused to travel by power of the engine 2.

In the parallel mode, the operation of the engine 2 is controlled, the generator 4 is driven by the engine 2, the motor 7 is driven by electric power generated by the generator 4 and electric power stored in the high voltage battery 3, and the drive wheels 11 are driven by power of the motor 7. Further, in the parallel mode, the clutch 8a in the reducer 8 is connected, the operation of the engine 2 is controlled, and the drive wheels 11 are driven by power of the engine 2 via the reducer 8 to cause the vehicle 1 to travel. Specifically, the parallel mode is a travel mode in which the vehicle 1 is caused to travel by power of the motor 7 and the engine 2.

The hybrid control unit 30 performs clutch sticking determination control to determine presence or absence of closed sticking (corresponding to sticking in the present invention) of the clutch 8a in the reducer 8, more specifically, presence or absence of closed sticking that is sticking of the clutch 8a in a connected state, when the hybrid control mode is the series mode.

Now, the clutch sticking determination control performed by the hybrid control unit 30 in the control device for a hybrid vehicle thus configured according to the present invention will be described.

Figure 2:
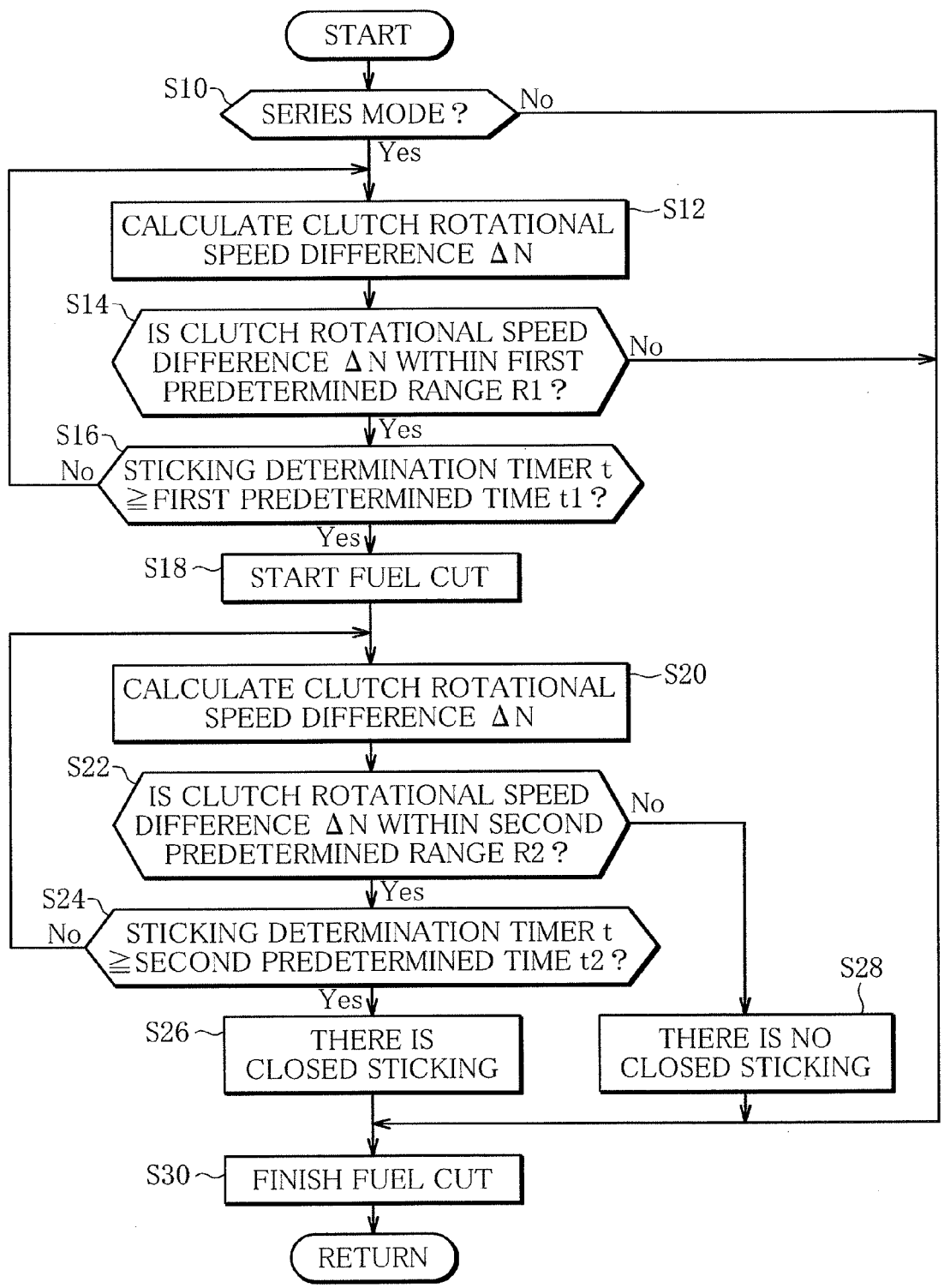
FIG. 2 is a flowchart of clutch sticking determination control performed by the control device for a hybrid vehicle according to the present invention.
Figure 3:
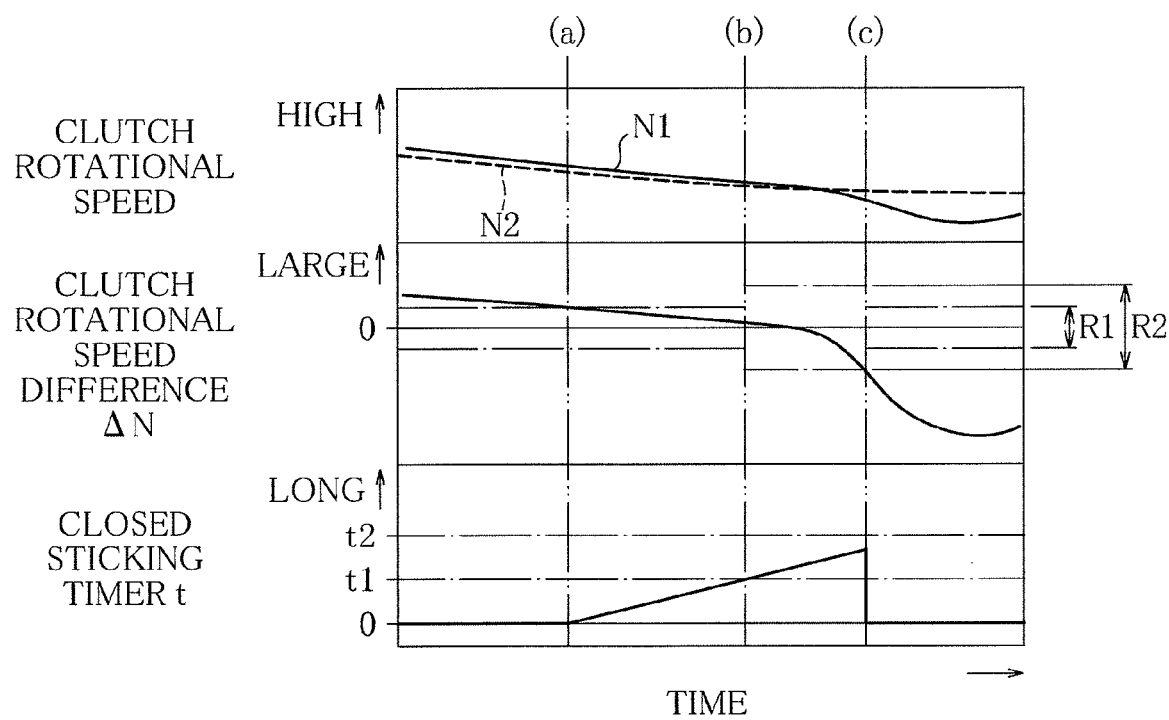
FIG. 3 is a time chart when a clutch in clutch sticking determination is normal.
Figure 4:
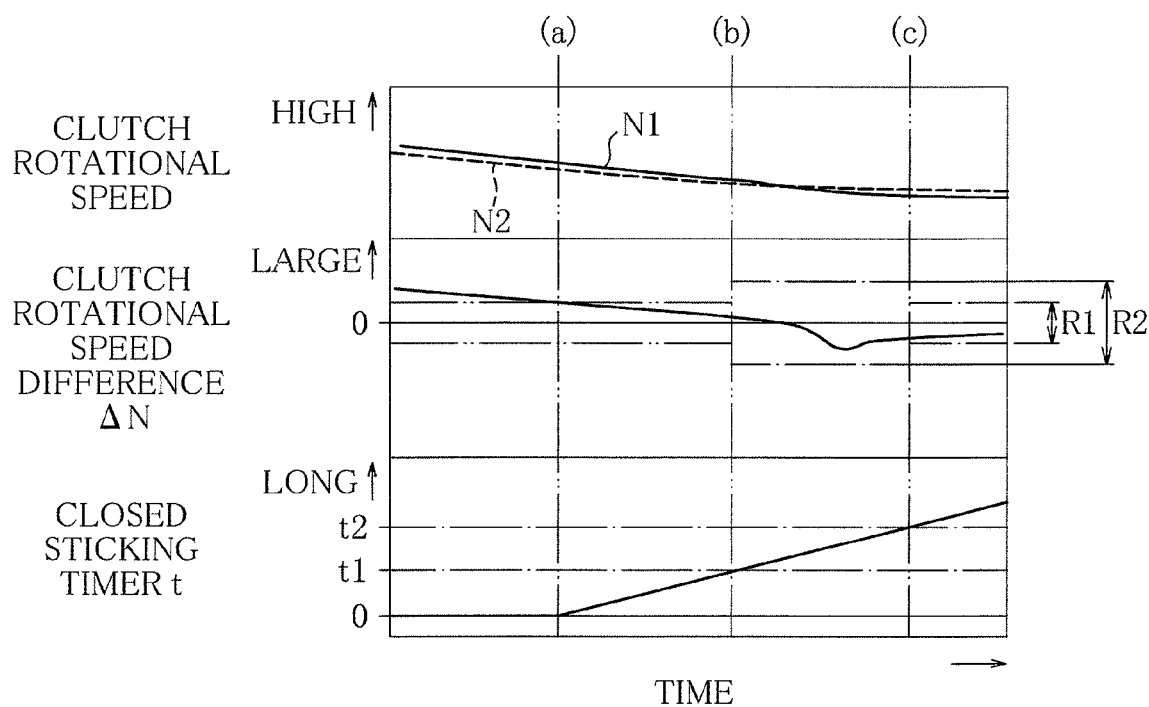
FIG. 4 is a time chart when there is sticking of the clutch in clutch sticking determination.

FIG. 2 is a flowchart of the clutch sticking determination control. FIG. 3 is a time chart when the clutch in clutch sticking determination is normal. FIG. 4 is a time chart when there is sticking in the clutch in clutch sticking determination.

FIGS. 3 and 4 show, from an upper row on an axis of ordinate, a clutch rotational speed, a clutch front and rear rotational speed difference (corresponding to a difference between a rotational speed of the upstream clutch provided on the side of the internal combustion engine of the transmission path and a rotational speed of the downstream clutch provided on a side of the drive wheels of the transmission path in the present invention) $\Delta N$, and a closed sticking determination timer. Solid lines of the clutch rotational speed in FIGS. 3 and 4 show a clutch front rotational speed N1 that is the rotational speed of the clutch on the side of the engine 2, that is, the upstream clutch (corresponding to the rotational speed of the upstream clutch provided on the side of the internal combustion engine of the transmission path in the present invention). The broken lines show a clutch rear rotational speed N2 that is the rotational speed of the clutch on the side of the drive wheels 11, that is, the downstream clutch (rotational speed of the downstream clutch provided on the side of the drive wheels of the transmission path). R1 denotes a first predetermined range (corresponding to a predetermined range in the present invention) R1. R2 denotes a second predetermined range R2. The first predetermined range R1 is a region in which clutch sticking determination is started when the clutch front and rear rotational speed difference $\Delta N$ is within the first predetermined range R1. The second predetermined range R2 is a region in which it is determined that the clutch 8a is in closed sticking when the clutch front and rear rotational speed difference $\Delta N$ is within the second predetermined range R2 under a predetermined condition. t1 denotes a first predetermined time (corresponding to a predetermined period of the present invention). t2 denotes a second predetermined time. The first predetermined time t1 is a time between when the clutch front and rear rotational speed difference $\Delta N$ is within the first predetermined range R1 and when the engine 2 performs fuel cut. The second predetermined time t2 is a time between when the clutch front and rear rotational speed difference $\Delta N$ is within the first predetermined range R1 and when presence or absence of closed sticking of the clutch 8a is determined.

As shown in FIG. 2, in Step S10, it is determined whether or not the hybrid control mode is the series mode. When the determination result is true (Yes), and the hybrid control mode is the series mode, the process proceeds to Step S12. When the determination result is false (No), and the hybrid control mode is not the series mode, this routine is returned.

In Step S12, the clutch rotational speed difference $\Delta N$ is calculated. More specifically, the clutch rear rotational speed N2 that is the rotational speed of the clutch 8a on the side of the drive wheels 11 is calculated from a vehicle speed detected by the vehicle speed sensor 9, an outer circumference of a tire, and a reduction ratio of the reducer 8. Then, the clutch front rotational speed N1 that is the rotational speed of the clutch 8a on the side of the engine 2 is calculated from the engine rotational speed calculated based on the detection signal of the crank angle sensor of the engine 2 by the engine control unit 20 and the reduction ratio of the reducer 8. Then, the clutch rotational speed difference ΔN that is a difference between the clutch front rotational speed N1 and the clutch rear rotational speed N2 is calculated. Then, the process proceeds to Step S14.

In Step S14, it is determined whether or not the clutch rotational speed difference ΔN is within the first predetermined range R1. When the determination result is true (Yes) and the clutch rotational speed difference ΔN is within the first predetermined range R1, counting by the closed sticking timer t is started or continued, and the process proceeds to Step S16. When the determination result is false (No) and the clutch rotational speed difference ΔN is not within the first predetermined range R1, this routine is returned. The closed sticking timer t starts counting only when the process of Step S14 is first performed. The closed sticking timer t continues counting when the process returns from Step S16.

In Step S16, it is determined whether or not the closed sticking timer t indicates the first predetermined time t1 or longer. More specifically, it is determined whether or not the closed sticking timer t indicates the first predetermined time t1 or longer, and the first predetermined time t1 has passed since the clutch rotational speed difference ΔN is within the first predetermined range R1. When the determination result is true (Yes), the closed sticking timer t indicates the first predetermined time t1 or longer, and the first predetermined time t1 has passed since the clutch rotational speed difference ΔN is within the first predetermined range R1, the process proceeds to Step S18. When the determination result is false (No), the closed sticking timer t indicates less than the first predetermined time t1, and the first predetermined time t1 has not passed since the clutch rotational speed difference ΔN is within the first predetermined range R1, the process returns to Step S12.

In Step S18, fuel cut is started. More specifically, a fuel cut signal is supplied to the engine control unit 20 to stop supply of fuel to the engine 2. Then, the process proceeds to Step S20.

In Step S20, the clutch rotational speed difference ΔN is calculated as in Step S12. Then, the process proceeds to Step S22.

In Step S22, it is determined whether or not the clutch rotational speed difference ΔN is within the second predetermined range R2. When the determination result is true (Yes) and the clutch rotational speed difference ΔN is within the second predetermined range R2, the process proceeds to Step S24. When the determination result is false (No) and the clutch rotational speed difference ΔN is not within the second predetermined range R2, the process proceeds to Step S28.

In Step S24, it is determined whether or not the closed sticking timer t indicates the second predetermined time t2 or longer. More specifically, it is determined whether or not the closed sticking timer t indicates the second predetermined time t2 or longer, and the second predetermined time t2 has passed since the clutch rotational speed difference ΔN is within the first predetermined range R1. When the determination result is true (Yes), the closed sticking timer t indicates the second predetermined time t2 or longer, and the second predetermined time t2 has passed since the clutch rotational speed difference ΔN is within the first predetermined range R1, the process proceeds to Step S26. When the determination result is false (No), the closed sticking timer t indicates less than the second predetermined time t2, and the second predetermined time t2 has not passed since the clutch rotational speed difference ΔN is within the first predetermined range R1, the process returns to Step S20.

In Step S26, it is determined that there is closed sticking of the clutch 8a, and counting by the closed sticking timer t is finished. Then, the process proceeds to Step S30.

In Step S28, it is determined that there is no closed sticking of the clutch 8a, and counting by the closed sticking timer t is finished. Then, the process proceeds to Step S30.

In Step S30, fuel cut is finished. More specifically, supply of the fuel cut signal to the engine control unit 20 is stopped to restart supply of fuel to the engine 2. Then, this routine is returned.

As such, in the control device for a hybrid vehicle according to the present invention, when the hybrid control mode is the series mode, the clutch rear rotational speed N2 that is the rotational speed of the clutch 8a on the side of the drive wheels 11 is calculated from a vehicle speed detected by the vehicle speed sensor 9, an outer circumference of a tire, and a reduction ratio of the reducer 8. Also, the clutch front rotational speed N1 that is the rotational speed of the clutch 8a on the side of the engine 2 is calculated from the engine rotational speed calculated based on the detection signal of the crank angle sensor of the engine 2 by the engine control unit 20 and the reduction ratio of the reducer 8. Then, the clutch rotational speed difference ΔN that is the difference between the clutch front rotational speed N1 and the clutch rear rotational speed N2 is calculated. When the clutch rotational speed difference ΔN is within the first predetermined range R1 ((a) in FIGS. 3 and 4), the closed sticking timer t indicates the first predetermined time t1 or longer, and the clutch rotational speed difference ΔN is maintained within the first predetermined range R1 for the first predetermined time t1, the fuel cut signal is supplied to the engine control unit 20, and supply of the fuel to the engine 2 is stopped ((b) in FIGS. 3 and 4). Then, the clutch rotational speed difference ΔN is again calculated. When the closed sticking timer t indicates the second predetermined time t2 or longer, and the clutch rotational speed difference ΔN is within the second predetermined range R2 even after the second predetermined time t2 has passed since the clutch front and rear rotational speed difference ΔN is within the first predetermined range R1, it is determined that there is closed sticking of the clutch 8a ((c) in FIG. 4). When the closed sticking timer t indicates less than the second predetermined time t2, and the clutch rotational speed difference ΔN is out of the second predetermined range R2 before the second predetermined time t2 has passed since the clutch front and rear rotational speed difference ΔN is within the first predetermined range R1, it is determined that there is no closed sticking of the clutch 8a ((c) in FIG. 3).

If the clutch 8a is normally operated by performing fuel cut in sticking determination of the clutch 8a, as shown in FIG. 3, the output torque of the engine 2 decreases, the rotational speed of the engine 2 decreases, and the clutch rotational speed difference ΔN is out of the second predetermined range R2.

Thus, when the clutch rotational speed difference ΔN is out of the second predetermined range R2 and the clutch front and rear rotational speed difference ΔN is large when fuel cut is performed, it can be determined that there is no closed sticking of the clutch 8a. Also, when the clutch rotational speed difference ΔN is within the second predetermined range R2, and there is no clutch front and rear rotational speed difference ΔN or there is an extremely small clutch front and rear rotational speed difference ΔN, the clutch rotational speed N1 on the side of the engine 2 approaches the clutch rotational speed N2 on the side of the drive wheels 11, rotation of the clutch 8a on the side of the engine 2 is synchronized with rotation of the clutch 8a on the side of the drive wheels 11, and it can be determined that there is closed sticking of the clutch 8a.

Thus, for example, depending on a traveling state of the vehicle 1 and a power generation state of the generator 4 by driving of the engine 2, even if the clutch rotational speed N1 on the side of the engine 2 approaches the clutch rotational speed N2 on the side of the drive wheels 11, presence or absence of closed sticking of the clutch 8a can be reliably determined.

Also, the rotational speed of the engine 2 is reduced by stopping supply of fuel to the engine 2, that is, fuel cut, and thus combustion in a cylinder of the engine 2 can be stopped, that is, the operation of the engine 2 can be stopped. Thus, the output torque of the internal combustion engine can be early reduced, that is, the rotational speed of the engine 2 can be early reduced.

Thus, presence or absence of closed sticking of the clutch 8a can be early determined.

The description on the embodiment of the present invention is now finished, but the present invention is not limited to the embodiment.

For example, in this embodiment, the rotational speed of the engine 2 is reduced by fuel cut, but not limited to this. Ignition timing of the engine 2 may be delayed to reduce the output torque of the engine 2 and reduce the rotational speed of the engine 2.

The rotational speed of the engine 2 is reduced by fuel cut, but not limited to this. For example, the amount of electric power generation of the generator 4 may be changed to reduce the rotational speed of the engine 2.

Closed sticking of the clutch 8a is determined before the second predetermined time t2 has passed since the clutch front and rear rotational speed difference ΔN is within the first predetermined range R1, but not limited to this. Closed sticking of the clutch 8a may be determined after a predetermined time from fuel cut.

What is claimed is:

1. A control device for a hybrid vehicle comprising:
an internal combustion engine provided in the vehicle;
a power generator that is driven by the internal combustion engine to generate electric power;
a secondary battery that stores the electric power generated by the power generator;
an electric motor that drives drive wheels of the vehicle using electric power supplied from the secondary battery;
a clutch that connects/disconnects a transmission path that transmits power from the internal combustion engine to the drive wheels;
a mode switching unit for switching between a first travel mode in which the clutch is released, the internal combustion engine drives the power generator to generate electric power, and the electric motor drives the drive wheels to cause the vehicle to travel, and a second travel mode in which the clutch is connected, and power of the internal combustion engine is transmitted to the drive wheels to cause the vehicle to travel;
a rotational speed difference detection unit for detecting a difference between a rotational speed of an upstream clutch provided on a side of the internal combustion engine of the transmission path and a rotational speed of a downstream clutch provided on a side of the drive wheels of the transmission path;
a rotational speed variable unit for performing rotational speed variable control to change the rotational speed of the upstream clutch provided on the side of the internal combustion engine when the difference between the rotational speeds detected by the rotational speed difference detection unit is held within a first predetermined range for a first predetermined period in the first travel mode; and
a sticking determination unit for performing sticking determination of the clutch based on whether the difference between the rotational speeds in the rotational speed variable control is within a second predetermined range greater than the first predetermined range for a second predetermined period after the first predetermined period or not.

2. The control device for a hybrid vehicle according to claim 1, wherein
the rotational speed variable unit reduces output torque of the internal combustion engine to change the rotational speed of the upstream clutch provided on the side of the internal combustion engine in the rotational speed variable control.

3. The control device for a hybrid vehicle according to claim 1, wherein
the rotational speed variable unit stops supply of fuel to the internal combustion engine to reduce the output torque of the internal combustion engine in the rotational speed variable control.

4. The control device for a hybrid vehicle according to claim 2, wherein
the rotational speed variable unit stops supply of fuel to the internal combustion engine to reduce the output torque of the internal combustion engine in the rotational speed variable control.

5. The control device for a hybrid vehicle according to claim 1, wherein
the rotational speed variable unit delays ignition timing of the internal combustion engine to reduce the output torque of the internal combustion engine in the rotational speed variable control.

6. The control device for a hybrid vehicle according to claim 2, wherein
the rotational speed variable unit delays ignition timing of the internal combustion engine to reduce the output torque of the internal combustion engine in the rotational speed variable control.

* * * * *